(12) United States Patent
Ndour et al.

(10) Patent No.: US 11,646,999 B2
(45) Date of Patent: May 9, 2023

(54) LOW DATA RATE SIGNALLING

(71) Applicant: Hewlett-Packard Development Company, L.P., Spring, TX (US)

(72) Inventors: Mamadou Diambar Ndour, Grenoble (FR); Patrick Jacques Andre Marie De Marcillac, Grenoble (FR); Sandro Secci, Grenoble (FR); Joshua Serratelli Schiffman, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 127 days.

(21) Appl. No.: 17/189,532

(22) Filed: Mar. 2, 2021

(65) Prior Publication Data

US 2021/0320902 A1 Oct. 14, 2021

(30) Foreign Application Priority Data

Apr. 10, 2020 (EP) .................................... 20290036

(51) Int. Cl.
*H04L 9/40* (2022.01)

(52) U.S. Cl.
CPC ...... *H04L 63/0263* (2013.01); *H04L 63/0209* (2013.01); *H04L 63/0236* (2013.01); *H04L 63/0876* (2013.01); *H04L 63/18* (2013.01); *H04L 63/20* (2013.01); *H04L 63/029* (2013.01)

(58) Field of Classification Search
CPC ............. H04L 63/0263; H04L 63/0209; H04L 63/0236; H04L 63/0876; H04L 63/18; H04L 63/20; H04L 63/029
See application file for complete search history.

(56) References Cited

U.S. PATENT DOCUMENTS

| | | |
|---|---|---|
| 9,026,840 B1 | 5/2015 | Kim |
| 9,628,126 B1 | 4/2017 | Hall et al. |
| 10,477,368 B2 | 11/2019 | Kodaypak |
| 10,931,300 B1* | 2/2021 | Coban ................... H03M 3/396 |
| 2005/0039047 A1 | 2/2005 | Raikar |
| 2017/0063566 A1 | 3/2017 | Seminario et al. |
| 2017/0346836 A1 | 11/2017 | Holland et al. |
| 2018/0227300 A1* | 8/2018 | Nakic ................. H04L 63/0442 |
| 2019/0342162 A1 | 11/2019 | Bendre |
| 2020/0007540 A1* | 1/2020 | Kawaguchi ........... H04L 9/0861 |
| 2020/0145409 A1* | 5/2020 | Pochuev ............... H04L 63/061 |
| 2020/0319925 A1* | 10/2020 | Clampitt, III ....... G06F 9/45558 |

FOREIGN PATENT DOCUMENTS

WO WO-2019195502 10/2019

* cited by examiner

Primary Examiner — Cheng-Feng Huang
(74) Attorney, Agent, or Firm — Knobbe, Martens, Olson & Bear, LLP

(57) ABSTRACT

In some examples, a method for generating a low data rate signal for transmission from a first network domain to a second network domain, the second network domain logically separated from the first network domain by a firewall, can include encoding a signal from a first device logically positioned within the first network domain to form a data signal, and transmitting the data signal over an out-of-band communications channel from the first network domain to the second network domain.

18 Claims, 4 Drawing Sheets

LOW DATA RATE SIGNALLING

BACKGROUND

Internet of things (IoT) devices can be used to transfer data over a network without any human interaction. There are a variety of use cases for IoT devices. However, in some environments, their use can be stymied by network firewall policies that can block communication to and from external services to which an IoT device may be connected. Requesting exceptions to such firewall policies is often lengthy and complex as it can introduce risk.

BRIEF DESCRIPTION OF THE DRAWINGS

For a more complete understanding of the present disclosure, reference is now made to the following descriptions taken in conjunction with the accompanying drawings, in which.

DESCRIPTION

Figure 1:
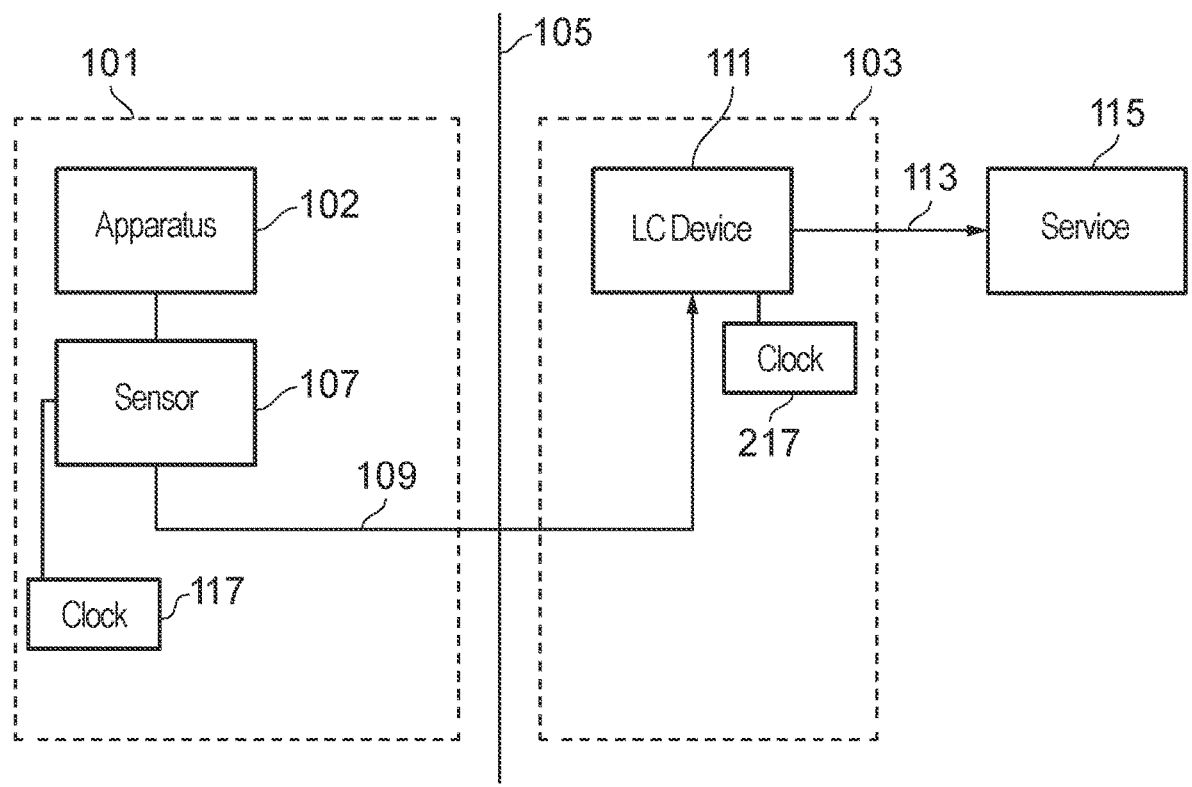
FIG. 1 is a schematic representation of a system according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

IoT devices are low complexity devices that can be used to transfer data from a variety of sources. For example, certain apparatus may be equipped with sensors that are configured to determine selected apparatus properties, and which are enabled to transfer data over one or more networks, such as the internet for example, using wired or wireless communication channels. To provide useful data and insights from such sensors, an external service can be used to process data from the sensors. An IoT device can act as a gateway between the apparatus and the external service, receiving data from the sensors and transferring it to the service. For example, an apparatus within a network infrastructure may be logically linked with an IoT device that is configured to transfer data relating to the apparatus to a service that is provided outside of the network infrastructure.

This kind of framework can fall foul of firewall rules. Such rules, put in place to safeguard a network infrastructure for example, can be highly regulated and changing them may introduce risk. Furthermore, the effort to change such policies can make simple tasks (such as those in which minimal data is transferred across the firewall) quite complicated. Accordingly, enabling data from a device that is logically behind a firewall of a network infrastructure to be used by a service that is outside that firewall can be problematic According to an example, there is provided a method for generating a low data rate signal for transmission from a first network domain to a second network domain, in which the second network domain is logically separated from the first network domain by a firewall. A signal from a first device logically positioned within the first network domain may be encoded to form a data signal. In an example, the data signal can comprise a single bit. Alternatively, the data signal can comprise multiple data bits, which may be transmitted periodically accordingly to a selected schedule that may be random. The data signal is transmitted over an out-of-band communications channel from the first network domain to the second network domain. That is, the data signal can be transferred using a communications channel that is not interrupted by the action of a firewall. The data signal can comprise a status signal, representing the status of one or more attributes of an apparatus. Since the data signal comprises a single bit, or several bits that are transferred according to, e.g., a random clock signal, an administrator of the first network domain who controls a firewall between the first and second network domains can be confident that there is no data leakage that could compromise restricted data within the first network domain.

In an example, a data signal can be used to provide telemetry data. For example, the data signal can be used to report on ink usage related to a printing apparatus, e.g. genuine ink usage, or whether a supply is running low and so on.

Another example is an automated service locker, which can be configured to enable a user to leave a problematic device such as a laptop for example for remote/automated servicing. A user can plug their device into, e.g., an internal ethernet port and the locker can secure a door and notify an enterprise IT to begin remediation. However, the successful use of such environments is predicated on the device being correctly connected to the internal network before a user leaves the device. Accordingly, although a connection status can be valuable, giving the locker environment access to both the internal and external networks poses a potential risk. Thus, a data signal such as that described above, which may comprise as little as a single bit of information that may be transferred sporadically, can overcome the issue.

This means that a sensor does not act as a potential covert channel for an attacker to use to exfiltrate data. To this end, according to an example, a low data rate is used, which may be coupled with a randomizer to frustrate data exfiltration attempts. Furthermore, if an IoT device is reacting to untrustworthy sensor data, the device may be tricked into acting incorrectly. Thus, in an example, an authentication protocol can be used that provides additional assurances to the service infrastructure and the IoT device.

Accordingly, a network administrator can enable an IoT device, which may be logically externally connected, to access internally firewalled data and services, such as data provided by a sensor of an apparatus behind the firewall.

FIG. 1 is a schematic representation of a system according to an example. A first network domain 101 comprises an apparatus 102, one or more attributes of which are to be monitored or reported on. For example, as described above, apparatus 102 may be a printing device, and an attribute to be monitored can be a type of print fluid (e.g. genuine vs. counterfeit).

In the example of FIG. 1, a second network domain 103 is logically separated from the first network domain 101 by a firewall 105. In an example, the firewall 105 comprises a network security system configured to monitor and control the ingress and/or egress of network traffic to/from the first network domain 101. The firewall 105 represents a barrier between the first network domain 101 and the second network domain 103. In the context of the present examples, the firewall 105 is configured and managed by, e.g., an administrator of the first network domain 101. Accordingly, the first network domain represents a trusted internal network for the administrator, whilst the second network domain 103 represents an untrusted external network. Accordingly, traffic transferred between the first network domain 101 and the second network domain 103 can be either allowed, inasmuch as it has been sanctioned by the administrator and is able to pass through the firewall 105, or not allowed such that it is blocked by the firewall 105.

A sensor 107 is provided logically within the first network domain 101 in order to measure an attribute of the apparatus 102. For example, the sensor 107 may be configured to receive data representing a print fluid type of a print apparatus, or the status (connected vs. not) of a wired connection between the apparatus 102 and an internal network of the first network domain 101, such as by determining the presence (or absence) of light signals from a network interface connection, and so on. In an example, the sensor 107 can comprise logic to receive information from multiple data sources including data derived from a measured apparatus attribute, events, and user input, which can be processed to generate a status signal as a result of potentially complex inputs.

The sensor 107 transmits a low data rate signal 109 to a low complexity device 111 positioned logically within the second network domain 103 (i.e. outside of the first network domain 101). The data signal 109 bypasses the firewall 105. More particularly, the data signal 109 is transmitted to the low complexity device 111 over an out-of-band communications channel from the first network domain 101 to the second network domain 103. Because of its low rate, the signal 109 does not therefore have to be part of a policy of the first network domain 101 that is provided to control the flow of traffic to/from the first network domain 101. In an example, a data rate can be tailored for a particular use case, and as such, a 'low' data rate may be different for different cases. For example, around 1 bit/month may be enough for a use case in which telemetry data representing a print fluid level is used. In another case, around 1 bit/day can be used for daily auditing daily (e.g. of a data centre network installation). In another case, such as a service locker for example, 1 bit around every 10 seconds can be used. In other cases, 1 bit around every second can be used. Broadly speaking, a low data rate can therefore be categorised as a data rate that limits a flow of data from the first network domain to the second network domain so as to frustrate data exfiltration attempts. Such a data rate can be from 1 bit per month upwards (i.e. a low data rate can be of the order of 1 bit/t, where t≤one month).

The sensor 107 can thus relay a low rate data status information signal to the low complexity device 111, which can be an IoT device, which can then forward information 113 relating to the received signal to a service 115. Thus, in an example, data and events generated within an internal firewalled first network domain 101 can be transferred to a service 115 that resides logically outside of the first network domain 101. Since the signal 109 comprises, for example, one bit of data, there is no information leakage from the first network domain 101 that would cause any user or device within that domain to become compromised.

Figure 2:
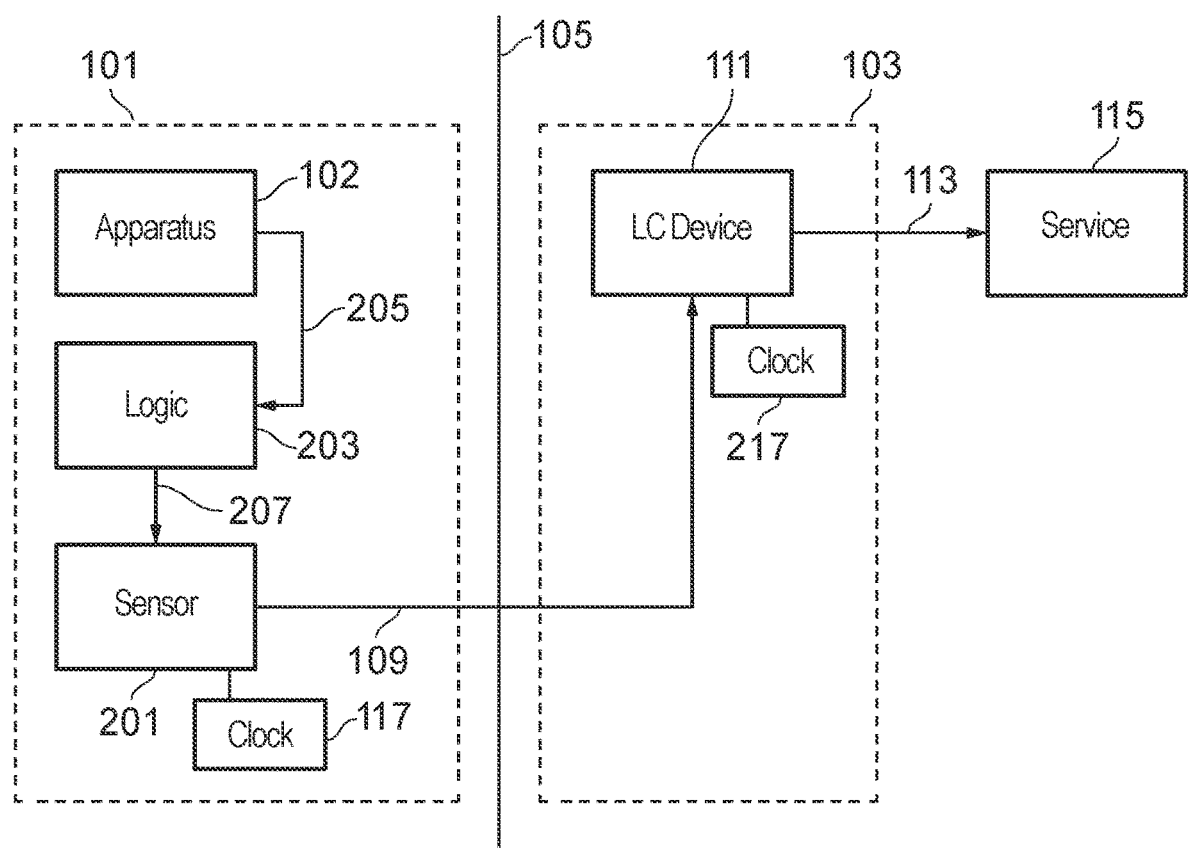
FIG. 2 is a schematic representation of a system according to an example.

FIG. 2 is a schematic representation of a system according to an example. Similar to the system described above with reference to FIG. 1, a first network domain 101 comprises an apparatus 102, one or more attributes of which are to be monitored or reported on.

In the example of FIG. 2, a second network domain 103 is, as with that of FIG. 1, logically separated from the first network domain 101 by a firewall 105. A sensor 201 is provided to receive input from a logic component 203. Logic component 203 receives data 205 from apparatus 102. In the example of FIG. 2, the sensor 201 receives data from logic component 203 over a short-range communication medium 207. For example, short-range communication medium 207 could be a light, short range radio, or near field communication.

The logic component 203 can receive data from multiple sources, such as data from a sensor of the apparatus 102, event data, and user input. In the example of FIG. 2, the logic component 203 generates a status signal that is transmitted over the medium 207 to sensor 201 for onward transfer to the low complexity device 111. In an example, the status signal can be a single bit of data, or a low data rate signal, that represents a set of inputs. For example, the logic component may receive multiple inputs each of which represents a value for a particular attribute of the apparatus 102, such as a level of print fluid in each of several colours for example. The logic component 203 may map these values for the attributes to an overall status representing the particular state of the apparatus. For example, a zero bit status signal may represent an apparatus condition in which a black print fluid is low and other colours are not low, whereas a one bit status signal may represent an apparatus condition in which a black print fluid is not low and other colours are low, and so on. More information may be communicated by way of the status signal by increasing the data rate, as will be described below in more detail.

Thus, in the example of FIG. 2, logic component 203 collects information from within the first network domain 101 representing the state of apparatus 102 and generates a status signal based on that state. The signal is received by a receiver sensor 201 that decodes the signal and transmits it to an, e.g., IoT device 111. The transfer from sensor 201 to device 111 can be implemented over a physical link, such as a wire, or a logical wire implemented as, e.g., a radio or other secured, direct communication channel. In an example, the link between the sensor 201 and the device 111 is a direct connection that does not depend on open ports of firewall 105 and is generally out-of-band from the first network domain 101.

According to an example, the communication medium 207 may be produced by many mechanisms including, but not limited to for example:

- Optical, e.g.—an LED turning on/off at a rate of, e.g., once per second and a corresponding optical reader (both may be enclosed in a non-transparent tube);
  - multi-coloured LEDs with the following status on/color1/color2/color3/off
- Sound, e.g.—a buzzer turning on/off on one frequency tone at a rate of, e.g. once each second and a corresponding recorder (both may be enclosed in a silencer tube);
  - a buzzer turning on/off on multi-frequency tones at a rate of, e.g., once each second and a corresponding recorder (both may be enclosed in a silencer tube);
- Solid, e.g.—a piston moved in/out at a rate of, e.g. once per second and a corresponding sensor (both of which may be enclosed in a protecting tube);
  - a piston moved in/out in several gradual steps at a rate of, e.g., once per second (and a corresponding sensor both enclosed in a protecting tube).
- Gas or liquid, e.g.—a pump or ventilator pushing a gas or liquid flow on/off and a corresponding valve sensing the flow in a tube processing that flow one-way at one pressure and speed level,
  - a pump or ventilator pushing a gas or liquid flow on/off in possibly both directions and at different throughputs and pressures and a corresponding valve sensing the flow in a tube processing that flow;
- Magnetic, e.g.—a magnetic field turning up/down at a rate of e.g. once per second and a corresponding magnetic reader (both of which may be enclosed in a non-magnetic conducive tube),
  - a magnetic field turning through several states at a rate of e.g. once per second and a corresponding magnetic reader (both of which may be enclosed in a non-magnetic conducive tube);
- Chemical, e.g. a chemical producer venting a chemical constituent on/off and a corresponding chemical analyzer enclosed in a tube processing that chemical through within a one-way flow,
  - a chemical producer venting several chemical constituents on/off and a corresponding chemical analyzer enclosed in a tube processing these chemicals through within a one-way flow;
- Electrical, e.g. a single metallic wire or silicon path able to change state amongst at least 2 states (on/off),
  - a single metallic wire or silicon path able to change state amongst multiple states;

Sensor 201 can be appropriately configured to interpret signals from the logic component 203.

In an example, a frequency at which a signal 109 may be emitted can be randomised in order to prevent de-multiplexing of a sequence of data bits forming a low data rate signal. Accordingly, the throughput of information transmitted is limited, and hence information transmitted can be in one of several intended statuses. Accordingly, a low data rate obtained by using a random emission clock can frustrate data exfiltration attempts as, without knowing the clock routine, the receiving end will not be able to decipher if, e.g., two zeros (00) are not a long zero (0) or two ones (11) are not a long one (1) and so on.

According to an example, a channel between the sensor and device 111 can use unsynchronised clocks 117, 217. That is, emission (from sensor 107, 201) and reception (device 111) clocks are not synchronised. In an example, the emission clock 117 may be configured with a minimum and maximum frequency. In the 1-bit status example, this can randomly change the length of each bit within the corresponding min-max length range. Accordingly, the reception clock 217 will read a 0 bit or 1 bit as they are and whenever they arrive and does not interpret any string from them. The clock 217 is, in an example, set to a fixed frequency at least equal or higher to the maximum emitted frequency, else a short bit change may be missed. Alternatively, the reception device 111 may listen for a long period of time to the emitted signal to eventually pick its min-max, and will be clocking itself faster that the max frequency emitted since the emitter will be so slow that any regular IoTs will clock much faster.

According to another example, a data signal can be transmitted over an out-of-band communications channel from the first network domain to the second network domain via a random frequency based on a random generator with a seed value pre-shared between the first network domain to the second network domain. That is, there can be a synchronisation between clocks of a transmitter (e.g. in the first network domain) and a receiver (e.g. in the second network domain).

For a more complex status a signal could be of various voltage levels or optical frequencies (i.e. colours) and so on so as to encode more than just 0 or 1 and still be emitted with a random length each to avoid a string re-construction on the receiving end.

For sensors that change status rarely (for example monthly in the case of a print fluid usage sensor), the lowest frequency of such a random clock can be set accordingly (i.e. monthly). In that case, any attacker changing the apparatus state to transmit a string of meaningful data comprising a sequence of 0's or 1's would have to wait for the longest period of the random clock to be sure that the receiver could decipher them as something other than a long 0 or a long 1. In an example, the random clock may signal a change from 0 to 1 much earlier than the longest possible clock period. That change may be picked up by the device 111. In some other examples, the randomisation pattern may be arranged such that most periods are short. For example, transitions from 1 to 0 may happen quite fast on average to maximize the IoT efficiency with enough frustration in the process to deter an attacker from using the system as a data channel. In other examples the longest random clock period may be shorter (for example in the locker situation where it is desired to let the user go as soon as a cable is connected, it may be 10 s).

As noted above, once the device 111 receives the status data 109, it may report events to the service infrastructure 115, react to the status, or a combination of both. For example, in the print apparatus scenario described above, the device 111 may be a telemetry collection device that is connected to a cloud service, but not the first network domain 101. Using a sensor 201 (or sensors), the device 111 may receive status information about, e.g., genuine ink status of printer apparatus in the first network domain 101 using, for example, a flashing LED, a BLE beacon, or another broadcast indicator.

In the locker scenario, a laptop for example may be designed to flash a specific light sequence when attached to an internal network. This in turn could indicate to a kiosk (locker) to report the event to the service infrastructure 115 itself instructing a user that the door may be closed and that he/she may go. In an example, the sensor 201 can authenticate the data source using a one-way, non-interactive authentication protocol. An example would be to synchronize the signalling mechanism and the device 111 with a known seed or counter. Once synchronised, the signal could be transmitted in time with a PRNG seeded with the known value. This way, the device 111 would know the source or class of sources that the data is coming from.

Figure 3:
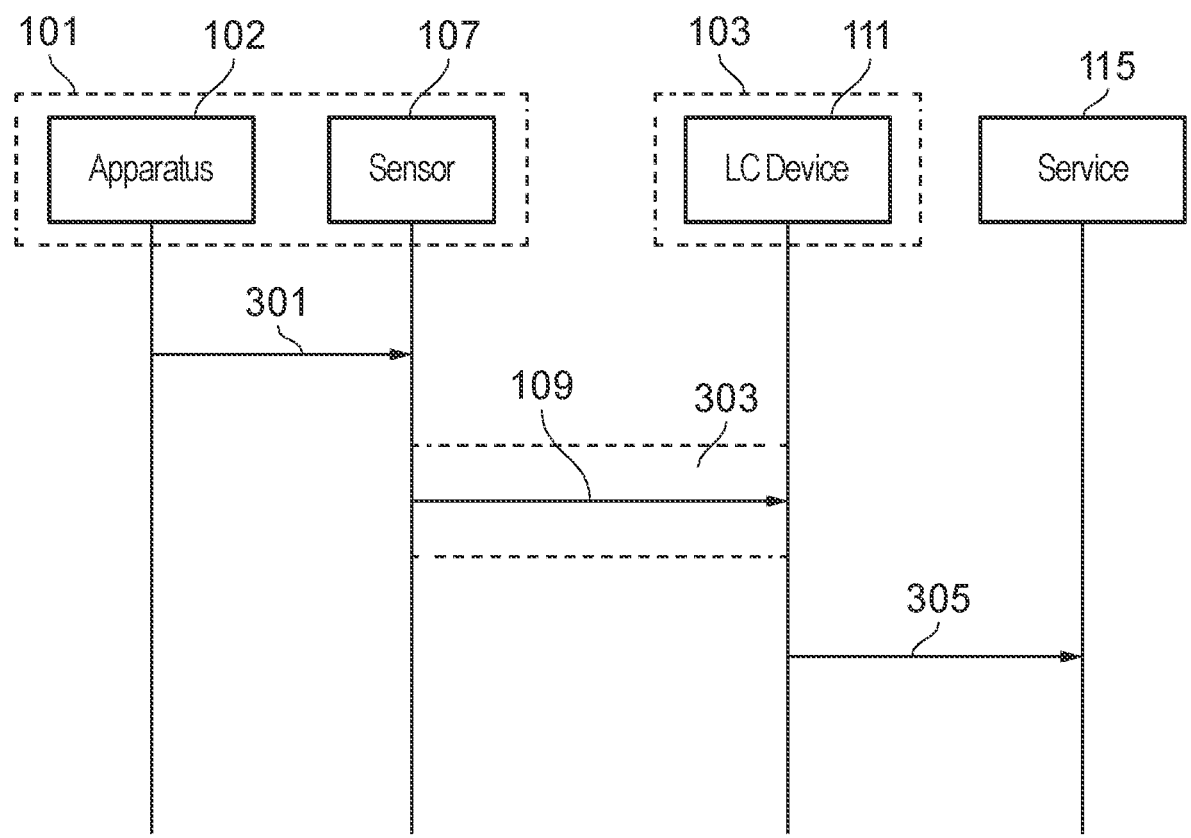
FIG. 3 is a schematic representation of a method according to an example.

FIG. 3 is a schematic representation of a method for generating a low data rate signal for transmission from a first network domain to a second network domain according to an example, in which the second network domain is logically separated from the first network domain by a firewall. A signal 301 from a first device 102 logically positioned within the first network domain 101 is encoded to form a data signal 109. The signal 301 may, in the example of FIG. 1, be a signal from apparatus 102 to sensor 107, or, in the example of FIG. 1, from logic component 203 to sensor 201. The signal 109 is transmitted over an out-of-band communications channel 303 from the first network domain 101 to the second network domain 103, and more particularly to the device 111, which may then forward it 305 to service 115.

Figure 4:
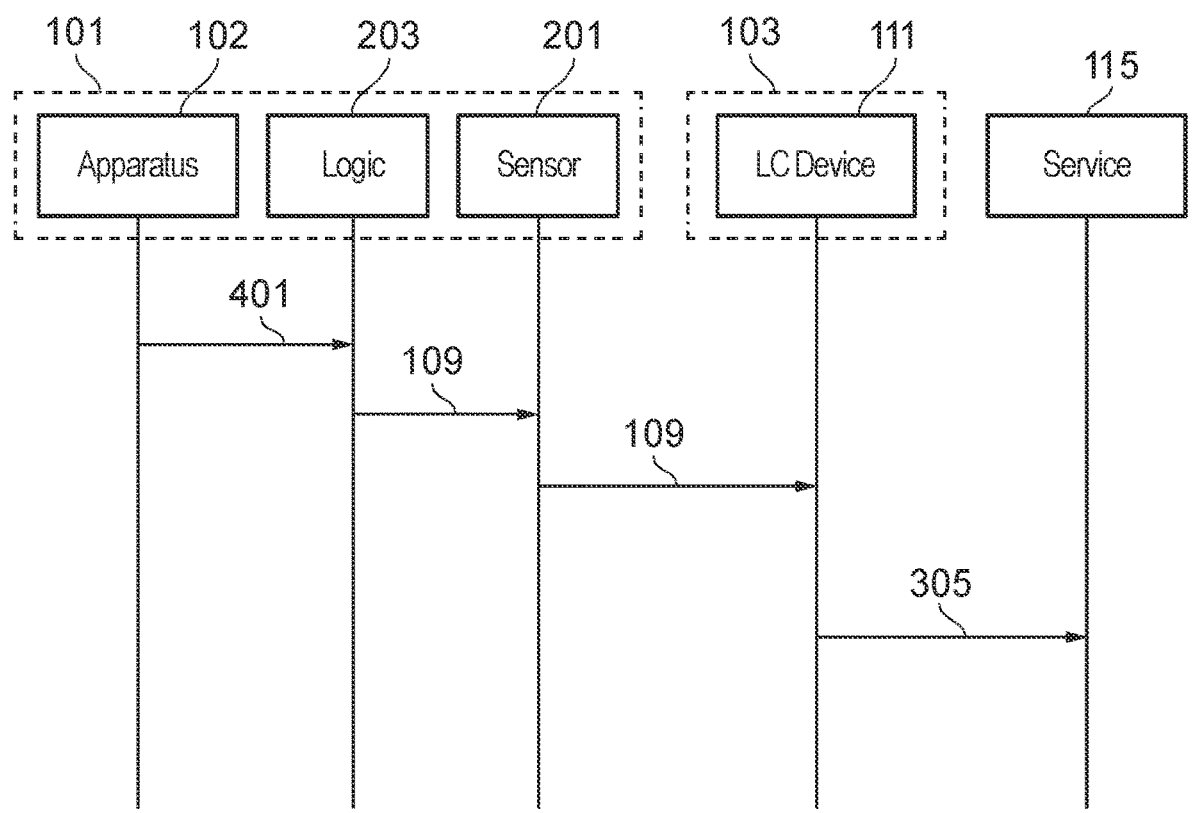
FIG. 4 is a schematic representation of a method according to an example.

FIG. 4 is a schematic representation of a method for generating a low data rate signal for transmission from a first network domain to a second network domain according to an example, in which the second network domain is logically separated from the first network domain by a firewall. A signal 401 from a first device 102 logically positioned within the first network domain 101 is received by logic component 203. Data represented by the signal 401 is encoded by the logic component 203 to form a data signal 109, which is transmitted to sensor 201 for onward transmission to device 111. The signal 109 is transmitted over an out-of-band communications channel from the first network domain 101 to the second network domain 103, and more particularly to the device 111, which may then forward it 305 to service 115.

The invention claimed is:

1. A method for generating a low data rate signal for transmission from a first network domain to a second network domain, the second network domain logically separated from the first network domain by a firewall, the method comprising:
   encoding a signal from a first device logically positioned within the first network domain to form a data signal; and
   transmitting the data signal over an out-of-band communications channel from the first network domain to the second network domain to bypass the firewall on the basis of a varied clock signal via a random frequency and based on a random generator with a seed value pre-shared between the first network domain to the second network domain.

2. The method as claimed in claim 1, wherein encoding the signal from the first device comprises:
   receiving the signal from the first device at a logic component;
   applying a rule to the signal to generate data representing an operating parameter of the first device; and
   using the data representing the operating parameter of the first device, generating the data signal.

3. The method as claimed in claim 2, further comprising:
   transmitting the data signal from a low complexity device logically positioned outside of the first network domain using the out-of-band communications channel.

4. The method as claimed in claim 1, wherein a frequency of the clock signal is configured to switch between a selected minimum and a selected maximum frequency.

5. The method as claimed in claim 1, wherein the out-of-band communications channel is a communications channel that is not interrupted by an action of the firewall.

6. The method as claimed in claim 1, wherein transmitting the data signal over the out-of-band communications channel from the first network domain to the second network domain on the basis of the varied clock signal via the random frequency and based on the random generator with the seed value pre-shared between the first network domain to the second network domain comprises synchronization between clocks of a transmitter in the first network domain and a receiver in the second network domain.

7. The method as claimed in claim 1, wherein the first network domain is a trusted internal network and the second network domain is an untrusted external network.

8. An apparatus for generating a low data rate signal for transmission from a first network infrastructure to a second network infrastructure, the second network infrastructure logically separated from the first network infrastructure by a firewall, the apparatus comprising:
   an encoder to encode data representing an operating parameter of a device within the first network infrastructure, and to generate a status signal; and
   a transmitter to transmit the status signal from the first network infrastructure to the second network infrastructure using an out-of-band communication channel to bypass the firewall, wherein the status signal is transmitted on the basis of a varied clock signal via a random frequency and based on a random generator with a seed value pre-shared between the first network infrastructure to the second network infrastructure.

9. The apparatus as claimed in claim 8, the encoder further to:
   receive a signal from the device within the first network infrastructure representing the data; and
   transmit the status signal to a sensor.

10. The apparatus as claimed in claim 9, the sensor to transmit the status signal to the transmitter.

11. The apparatus as claimed in claim 9, wherein the transmitter includes the sensor.

12. The apparatus as claimed in claim 9, wherein the encoder includes the sensor.

13. The apparatus as claimed in claim 9, the encoder to receive the signal from the device over a physical or wireless channel.

14. The apparatus as claimed in claim 13, wherein the wireless channel is an audio, optical, radio-frequency, magnetic, or chemical channel.

15. The apparatus as claimed in claim 13, wherein the physical channel is a wired or a mechanical channel.

16. The apparatus as claimed in claim 8, wherein the transmitter comprises a clock with a clock frequency selected between a minimum value and a maximum value.

17. The apparatus as claimed in claim 8, wherein the second network infrastructure includes an Internet of Things (IoT) device to receive the low data rate signal transmitted from the first network infrastructure.

18. The apparatus as claimed in claim 17, wherein the IoT device further transmits the low data rate signal to a service infrastructure to report an event of the first network infrastructure to the service infrastructure.

* * * * *